(No Model.) 3 Sheets—Sheet 1.
J. McGRATH.
COMBINED FLAX THRASHER AND CARD.
No. 489,493. Patented Jan. 10, 1893.
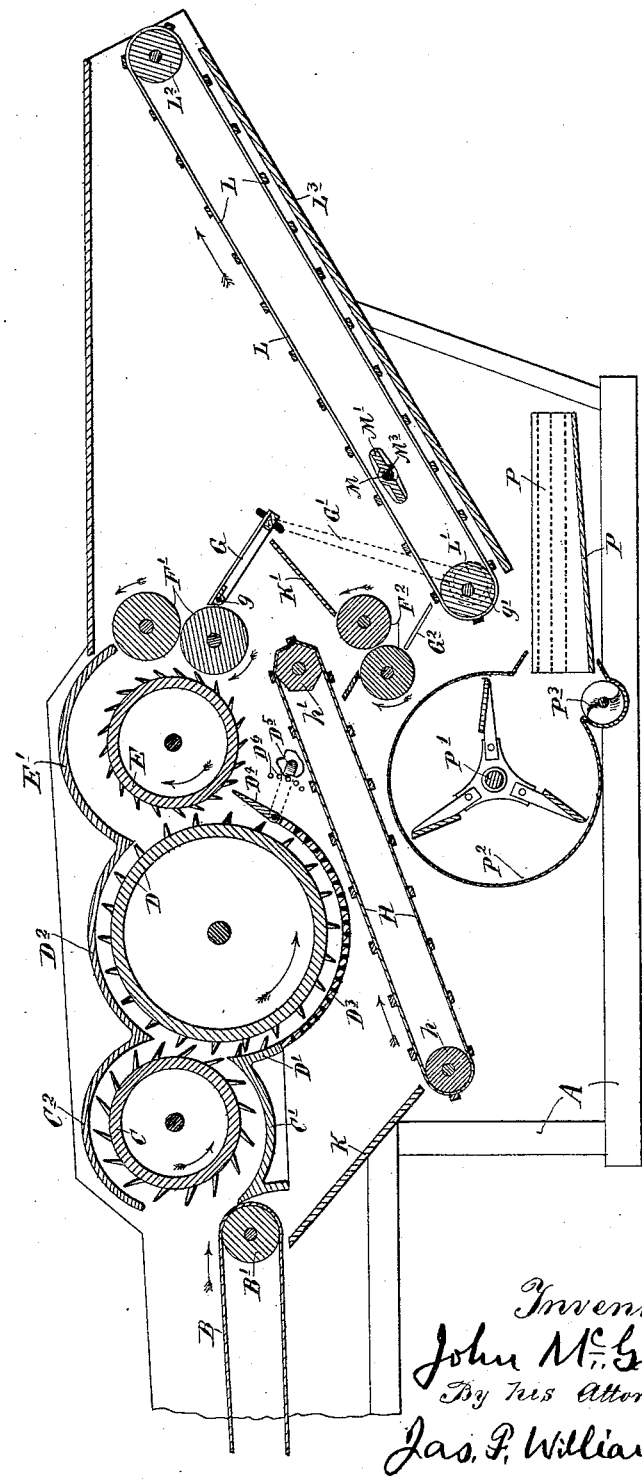
Witnesses.
A. H. Opsahl
E. F. Elmore
Inventor
John McGrath
By his Attorney.
Jas. F. Williamson (No Model.) 3 Sheets—Sheet 2.
J. McGRATH.
COMBINED FLAX THRASHER AND CARD.
No. 489,493. Patented Jan. 10, 1893.
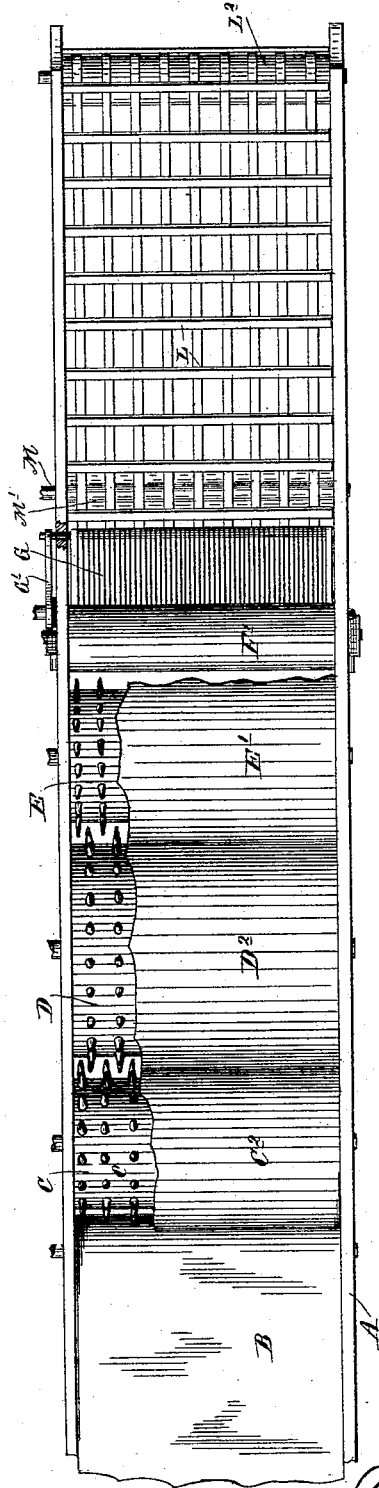
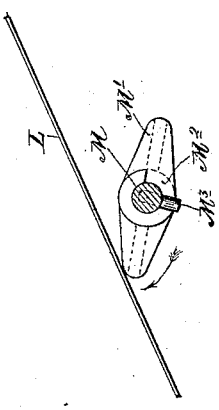

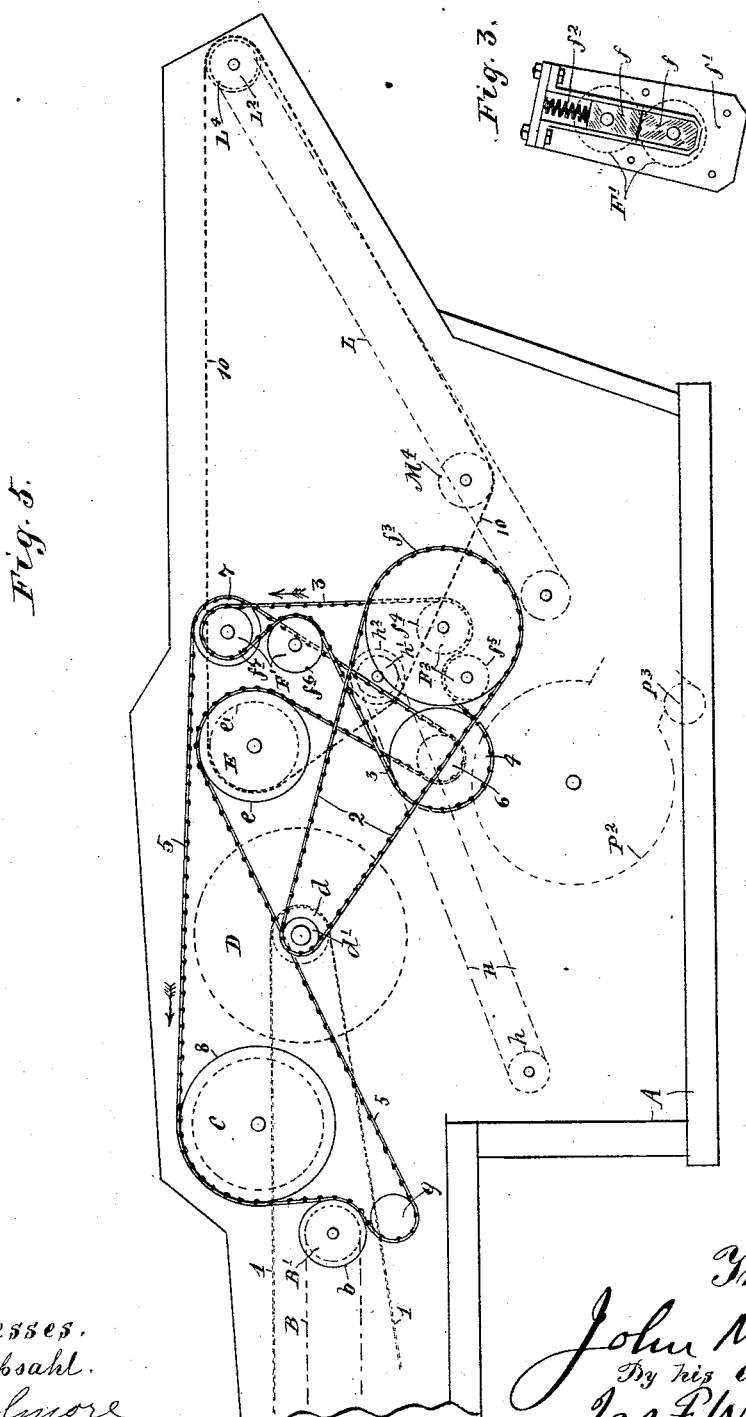

UNITED STATES PATENT OFFICE.

JOHN McGRATH, OF MINNEAPOLIS, MINNESOTA, ASSIGNOR OF THREE-FIFTHS TO GEORGE N. LYMAN, SR., OF SAME PLACE.

COMBINED FLAX THRASHER AND CARD.

SPECIFICATION forming part of Letters Patent No. 489,493, dated January 10, 1893.

Application filed July 25, 1892. Serial No. 441,087. (No model.)

*To all whom it may concern:*

Be it known that I, JOHN McGRATH, a citizen of the United States, residing at Minneapolis, in the county of Hennepin and State of Minnesota, have invented certain new and useful Improvements in a Combined Flax Thrasher and Card; and I do hereby declare the following to be a full, clear, and exact description of the invention, such as will enable others skilled in the art to which it appertains to make and use the same.

My invention relates to combined flax thrashers and cards.

The invention was especially designed for use on loose and tangled flax, with a view of perfectly separating out the seed without injury of the same; and with the further view of breaking up and separating out a large part of the woody matter or shives, while leaving the fiber unbroken and intact.

To this end, the invention consists of the mechanism hereinafter fully described and particularly defined in the claims.

A machine embodying my invention is illustrated in the accompanying drawings.

Therein like letters and figures refer to like parts throughout.

Figure 1 is a vertical longitudinal section through the machine, a part of the feed-table being broken away and some of the parts being shown in diagram only. Fig. 2 is a plan view of the same, the driving mechanism being omitted and some of the parts broken away; Fig. 3 is a detail, in end elevation, illustrating a pair of the boll crushing rollers; and Fig. 4 is a detail, in end elevation, illustrating a shaking device in its application to the straw-carrier. Fig. 5 is a diagrammatic view, in right side elevation, showing the driving mechanism.

A is the main frame, which may be of any suitable construction.

B is a feed-carrier or apron, mounted on and movable by suitable rollers, one of which is shown at $B'$.

C is a toothed feed-cylinder receiving from the feeding apron; and $C'$ and $C^2$ are lower and upper concave shells co-operating therewith.

D is a spiked thrashing cylinder and $D'$ a spiked concave co-operating therewith. The teeth of the feed cylinder C and the thrashing cylinder D are intercurrent with each other.

$D^2$ is a concave shell or casing over the thrashing cylinder; and $D^3$ is a perforated concave shell located under the thrashing cylinder.

$D^4$ is a pivoted tail-board, at the delivery end of the shell or casing $D^3$, which may be adjusted and set in any desired position, in respect to the thrashing cylinder, by means of the hand-lever $D^5$ and the stop-pins $D^6$.

E is a toothed doffing cylinder, the teeth of which are intercurrent with the spikes of the thrashing cylinder and receive therefrom.

$E'$ is a concave shell or casing over the top of the said doffing cylinder.

$F'$ is a pair of boll crushing rollers receiving from the doffing cylinder E. These rollers are mounted in sliding boxes $f$, which work in suitable bearing brackets $f'$, and under tension from a strong spring $f^2$. The lower boxes are of such length that the upper boxes, when in contact therewith, will hold the rollers spaced apart from each other a slight distance sufficient to avoid actual contact. In other words, these rollers work with their surfaces close together, but not touching each other. The two rollers should be sufficiently close to crush the bolls but not close enough to break the seed.

G is a separating table, receiving from the set of boll crushing rollers $F'$. This table is preferably made of single wires secured in a suitable frame, and properly spaced apart, so as to pass the seed and bolls, but to retain and deliver over the straw and woody matter, as tailings. This table is pivoted, at its upper end, as shown at $g$, and receives an oscillating or shaking motion in the vertical plane, from an eccentric rod $G'$, as will be presently noted.

H is a grain-belt or apron mounted on the rollers $h\ h'$, and underlying the feeding-cylinder, thrashing cylinder and the doffing cylinder, and receiving the seed and bolls dropped therefrom.

K is a guide-board, spanning the space between the delivery end of the feeding belt and the receiving end of the grain belt, for directing to the latter any seed or bolls which may escape between the feeding apron and the feed cylinder.

F² is a second set of boll crushing rollers, located below the delivery end of the grain belt, and receiving therefrom, and also from the separating table G.

K' is a guide-board spanning the space between the separating table G and the said set of boll crushing rollers F², for insuring the delivery thereto of the material dropped by the table, grain belt, and the other overhanging parts.

L is the straw carrier, of the ordinary slat and belt variety, mounted on the driving rollers L' and L², over the inclined deck L³, in the ordinary way. The lower roller L' has, on its left end, an eccentric $g'$, which operates on the strap of the eccentric rod G', for imparting the oscillating motion to the separating table G.

M M' is a shaker, for the bearing surface of the straw-carrier L, which is of a special construction, adapted to give to the said carrier a jerking or flap-like motion. Of the said parts, M is a shaft which is kept in constant motion from some of the other running parts, and M' is a flat plate or slab-like piece, loosely sleeved on the shaft M, and constitutes the striker proper. The striker M' has a part of its hub cut away, as shown, at M²; and the shaft M has a pin M³, working in said slot or cut away part of the striker. When the parts are in the position shown in Fig. 4, the striker will be carried upward, in the direction of the arrow, by the pin M³, until it reaches the vertical position, lifting with it the bearing surface of the straw-carrier L. It will then be permitted to drop or turn on the shaft under the action of the carrier, a distance equal to the length of the slot M². This allows the straw-carrier to flap back below its normal position, by an instantaneous action, thereby giving a violent agitation to the bearing surface of the straw-carrier. Under this action, the straw and woody matter on the carrier will be effectively loosened and shaken up, causing the remaining seed to drop through the carrier on to the underlying deck, and be directed thereby to the riddle-shoe.

P is the riddle shoe, the positions of the riddles being shown in dotted lines. P' and P² are the blast-fan and fan case, and P³ the conveyer, for conducting away the separated seed.

G² is a fixed separating table somewhat similar to the table G, located directly below the second set F² of the boll crushing rollers, adapted to pass the seed to the riddle-shoe and to conduct the shives and woody matter over to the straw-carrier. The upper roller $h'$ supporting the delivery end of the grain belt or apron H is of polygonal form, the same being seven sided as shown. This construction of the roller $h'$ imparts a trembling motion to the grain belt, which serves to free the same of all the seed at its delivery end. If it were not for this trembling motion, some of the seed would adhere or lodge in the crotch between the slats and the cloth and might be carried past the boll crushing rollers F².

The relative speeds of some of the co-operating cylinders and crushing rollers, are of importance in this machine. The feed cylinder C, is preferably arranged to run at a speed of about twenty-six revolutions per minute. The thrashing cylinder D, is preferably arranged to run at about seven hundred and fifty revolutions per minute; the doffing cylinder E, at about thirty-seven revolutions per minute. The upper member of the pair of crushing rollers F' runs at about one hundred and sixty-seven revolutions, and the lower member of the said pair of rollers F' at about one hundred and fifty revolutions per minute. The pair of crushing rollers F² run at the same relative rates as the rollers F', the upper being speeded to one hundred and sixty-seven, and the latter to one hundred and fifty revolutions. The exact speeds are of course not so important; but the said parts should have different speeds, in something near the ratios stated, in order to best accomplish the work.

The driving connections, for operating the said parts, together with the other movable parts of the machine, may be readily traced, by reference to the diagram Fig. 5. In respect to the said diagram, it should be noted that the dotted lines show driving connections which are located on the left side of the machine; and the full lines, the driving connections on the right side of the machine. It may be further noted, that all the driving connections are in the form of link belts and sprocket-wheels, with the exception of the main driving belt, for the application of power from the engine, not shown.

1 is the main belt, applied to a pulley $d$, on the left end of the thrashing cylinder shaft D. 2 is the outermost chain, on the right side of the machine, running over a sprocket $d'$, on the right end of the thrashing cylinder shaft, and a relatively large sprocket $f^3$ on the right end of the upper member of the pair of crushing rollers $f^2$. 3 is a chain directly inside the chain 2, which passes over a small sprocket $f^4$, on the end of the crushing roller F², just inside the sprocket $f^3$, over a smaller sprocket $f^5$ on the lower member of the said crushing rollers F², over an idler 4 and sprockets $f^6$ and $f^7$ on the right ends of the upper pair of crushing rollers F'; of which sprockets $f^6$ and $f^7$, the member $f^7$ is smaller than the member $f^6$. 5 is a chain, driven from a small sprocket 6, on the hub of the idler 4, and passing over an idler 7, loosely mounted on the shaft of the upper member of the pair of crushing rollers F'; and thence over a large sprocket 8, on the right end of the shaft of the feed cylinder C; thence under a sprocket $b$, on the feed apron drum or roller $b$; thence over an idler 9, and back over the top of a sprocket $e$, on the right end of doffer cylinder E. These chains, so far described, will give, taken together with the sprockets specified, the proper speeds to the feed apron B, the cylinders C, D, E, and the pairs of crushing rollers F' F². The grain-belt H and the carrier L, are driven from a sprocket $e'$, on the left end of the doffer cylinder E, by a chain 10, which passes over sprocket $h^2$ on the apron roller $h'$, and a sprocket $L^4$ on the upper carrier roller $L^2$. The chain 10 also passes under a sprocket $M^4$, on the left end of the striker M.

From the foregoing, it will be seen that all the movable parts of the machine are driven from the thrashing cylinder D, through the four chains 2, 3, 5 and 10, and suitably arranged sprockets of the proper sizes, to give the desired directions and relative speeds. The chains and sprockets move in the direction indicated by the arrows.

The general action or operation of the machine is as follows:—The flax as supplied by the feed apron B, will be caught by the slow speeded cylinder C and delivered to the thrashing cylinder D and concaves $D' D^2$. The co-operation of the feed-cylinder C, thrashing-cylinder D, and the concaves $D'$ and $D^2$ will effectually thrash the flax, thereby separating out the seed or stripping off the bolls from the straw. The free seed separated at the thrashing cylinder may pass through the perforations in the shell $D^3$, on to the grain-belt or apron H. The intercurrent action of the teeth of the feed and thrashing cylinder and of the concave $D'$, serves also to break up and remove from the fiber of the straw a large part of the shive or woody matter. The loose bolls and the broken up shive will be delivered from the thrashing cylinder and shell $D^3$, over the tail-board $D^4$, on to the delivery end of the grain-belt H; while the straw or unseparated stock will be caught and removed from the thrashing cylinder D, by the slow speeded doffing cylinder E. The fact that the teeth of the thrashing and the doffing cylinder are intercurrent, further assists in the thrashing action, and also has a carding action on the stock. More or less of the seed and bolls will fall between the doffer and the crushing rollers onto the grain-belt; while the stock will be delivered by the doffer to the upper pair of boll crushing rollers F'. These rollers F' will strip from the straw all the remaining bolls, and will also crush the bolls, and deliver the stock and the seed together onto the separating table G. Thence, the straw will pass on to the carrier L, while the seed will pass through the separating table, and along with the bolls from the grain-belt H, will be delivered and subjected to the action of the second set of crushing rollers F². The rollers F² deliver to the second separating table G², and the seed will pass through the same to the riddle-shoe P; while the shives and woody stock will pass on to the carrier L. If there be any loose seed remaining in the straw or broken bolls or shives, it will be shaken out, under the agitating action of the carrier L and will be delivered by the inclined deck $L^3$ to the riddle-shoe P. In virtue of the spacing of the members of the pairs of crushing rollers F' and F², as hereinbefore noted, the seed will not be broken or scratched by the said rollers, but will be delivered therefrom intact. Having regard now to the straw and fiber, it will be noted that all the intercurrent teeth of the co-operating cylinders C, D and E, are inclined or set on a backward angle with respect to the movement of the stock. Hence, in their engaging or intercurrent action, they will break up the woody matter or shive and separate the same from the fiber, while permitting the fiber to be drawn over the teeth, without being broken or torn, having in this respect a carding action on the stock.

Owing to the difference in the relative speeds between the upper pair of crushing rollers F' and the doffing cylinder E, the stock as delivered from the doffer will be thinned out, enabling the action of the rollers F' to be more effective. The difference in the speeds between the doffer and the said pair of rollers F', together with the blast from the fan helps the rollers F', to catch or "lick-in" the stock. The difference in speed between the two members of the pair of rollers F', give a drawing and rubbing action, which taken together with their crushing action, serves to further break up and remove the woody matter or shive, without injury to the fiber. The general result of the mechanism, in respect to the straw, is to break up and remove the largest part of the woody matter or shive, while leaving the fiber intact. The stock or fiber as it comes from this machine, is in such condition that it may be made fit for the spinning machine, by passing the same through a single card. In other words, by the use of this machine and a single card, fiber may be obtained from which may be spun a coarse yarn or twine, well adapted for binding, bagging, coarse cloths, and many other purposes.

Taken in the two points of view, to-wit; with regard to its action on the seed and its action on the fiber, this machine is practically a combined thrasher and card. It should be noted, that in virtue of the fact that the members of the crushing rollers F' and F², are independently driven, there can be no choking or clogging at that point. It should be further noted, in respect to the intercurrent action of the teeth of the co-operating cylinders C, D and E, that the same, together with their differential speeds prevents the wrapping of the stock about the cylinders.

The machine has been shown and described as a complete machine for independent use; but of course it will be understood, that the essential mechanism might be constructed and applied as an attachment to an ordinary thrashing machine. It should be further noted, that while this machine was designed as a thrasher and card for flax, it is capable of use for thrashing many other kinds of seeds and grain, such for example, as clover and timothy.

What I claim and desire to secure by Letters Patent of the United States, is as follows:—

1. A combined flax thrasher and card, comprising a high speeded spiked thrashing cylinder and co-operating spiked concave, a slow speeded toothed feed cylinder having its teeth arranged to work intercurrent with the spikes of the thrashing cylinder on its receiving side, and a slow speeded toothed doffing cylinder, having its teeth arranged to intermesh or intersect with the spikes of the thrashing cylinder, on its delivery side, substantially as and for the purpose set forth.

2. The combination with the thrashing cylinder, concave and shell, of the doffing cylinder receiving from the thrashing cylinder, and the boll crushing rollers receiving from said doffing cylinder, substantially as described.

3. The combination with the thrashing cylinder and concave, of the doffing cylinder receiving from the thrashing cylinder, the boll crushing rollers receiving from the doffing cylinder, and the separating table receiving from said boll crushing rollers, substantially as described.

4. The combination with the boll crushing rollers through which the straw is passed, after leaving the thrashing cylinder, of the separating table receiving from said rollers, and means for imparting to the same an oscillating motion in the vertical plane, substantially as described.

5. The combination with the thrashing cylinder and the doffing cylinder receiving therefrom, of the concave and shell co-operating with the thrashing cylinder, and provided with an adjustable tail-board for varying the throat or passage from the thrashing to the doffing cylinder, substantially as described.

6. The combination with the co-operating cylinders C, D, and E, as described, of the grain belt or apron underlying said cylinders, and receiving the separated seed therefrom, and a pair of boll crushing rollers receiving from said grain belt or apron, substantially as described.

7. The combination with the feed-cylinder C, of the thrashing cylinder and concave D D', the shell D³, the tail-board D⁴, the doffing cylinder E, the boll crushing rollers F', the separating table G, the grain belt or apron H, and the lower or second set or boll crushing rollers F², all arranged and operating substantially as and for the purpose set forth.

8. The combination with a straw carrier, of a shaking device for the same, consisting of a constantly running shaft located under the bearing surface of the carrier, and a winged or flat striker, loosely sleeved on the said shaft, and provided with a peripheral slot in its hub of less length than the complete circle, in which works a driving pin or key fixed to the shaft, substantially as described, whereby the striker as propelled by the shaft will lift the carrier and then under the action of the carrier, the striker will turn or drop on the shaft, thereby imparting to the carrier a violent agitation, substantially as described.

9. The combination with the thrashing cylinder, of the doffing cylinder receiving therefrom, and the set of boll crushing rollers receiving therefrom speeded to run at a relatively high speed as compared with the said doffing cylinder, substantially as and for the purpose set forth.

10. The combination with the thrashing and the doffing cylinders, of the pair of independently driven boll crushing rollers F', one of which is driven at a higher speed than the other, substantially as and for the purpose set forth.

11. The combination with the thrashing and doffing cylinders, of the set of boll crushing, drawing and rubbing rollers F', running at a relatively high speed, as compared with the doffing cylinder and one of which is speeded to run faster than the other, substantially as and for the purposes set forth.

In testimony whereof I affix my signature in presence of two witnesses.

JOHN McGRATH.

Witnesses:
GEORGE N. LYMAN,
JAS. F. WILLIAMSON.